3,333,806
ADVERTISING DISPLAY DEVICE
Irving Woolf, 510 N. Dearborn St.,
Chicago, Ill. 60610
Filed Oct. 11, 1965, Ser. No. 494,785
18 Claims. (Cl. 248—201)

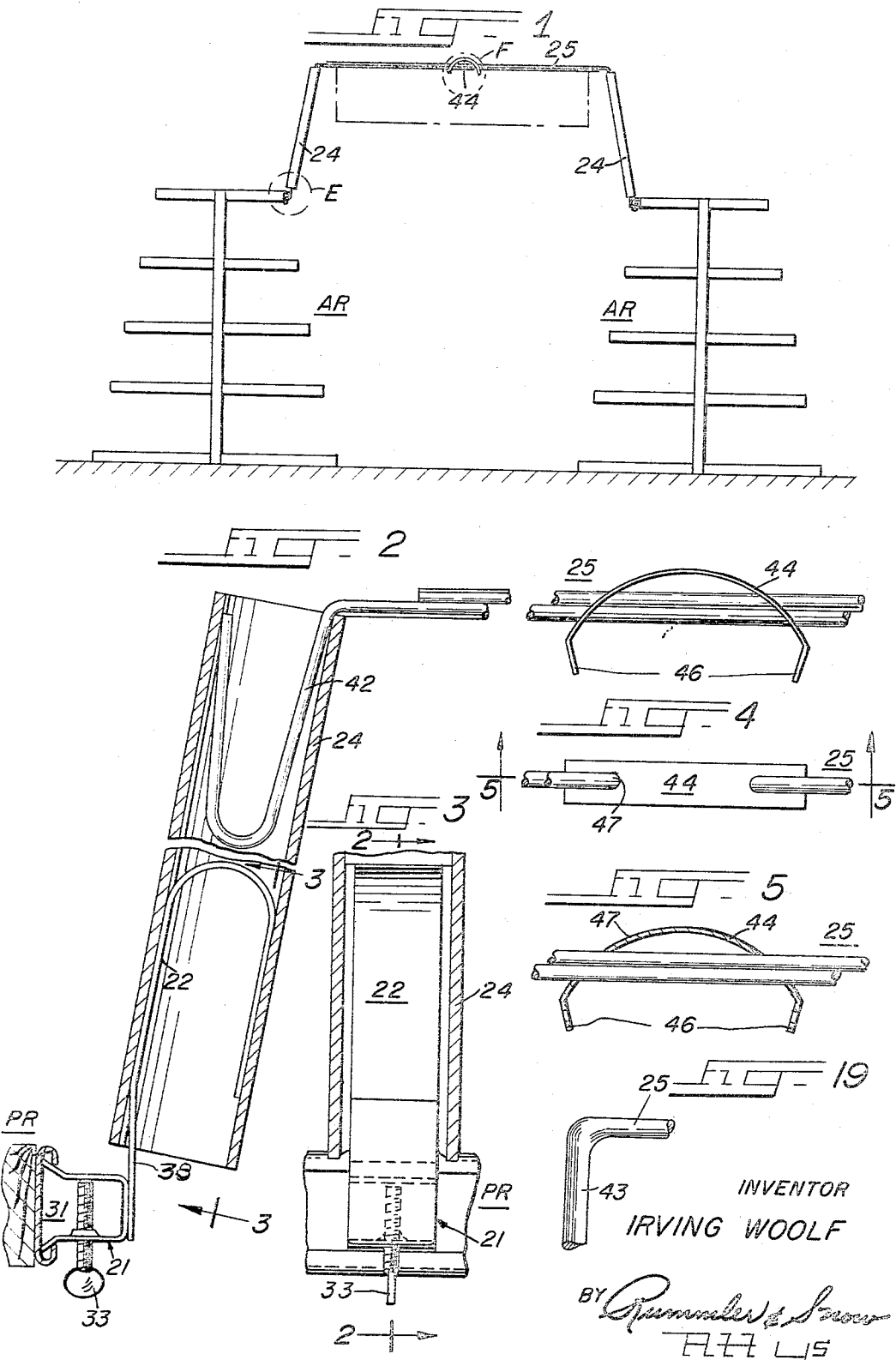

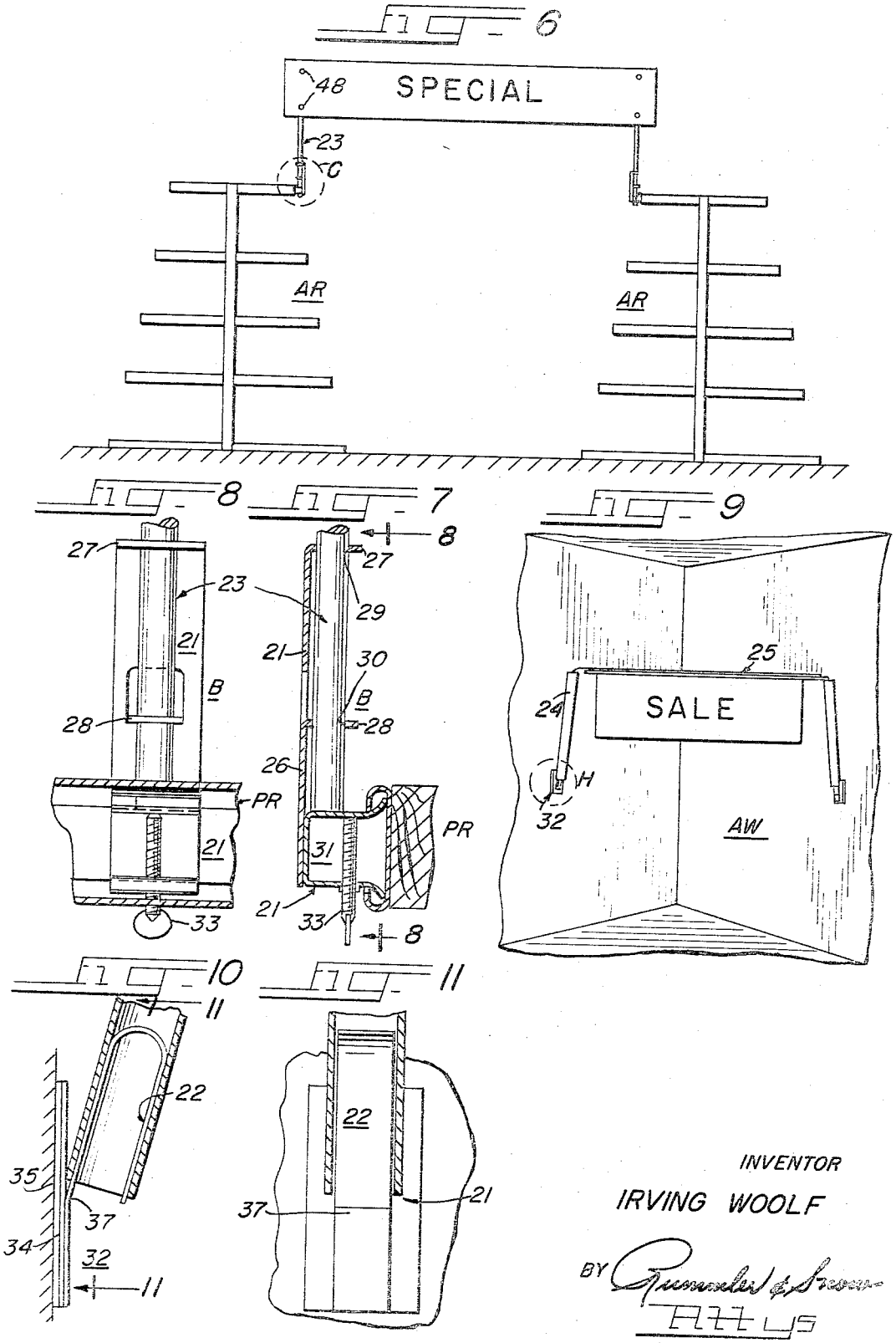

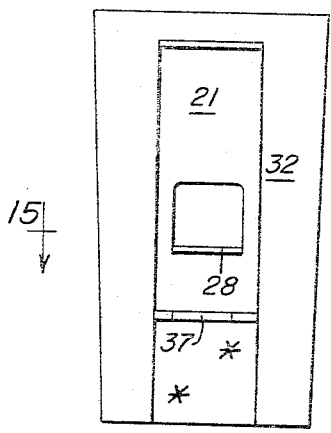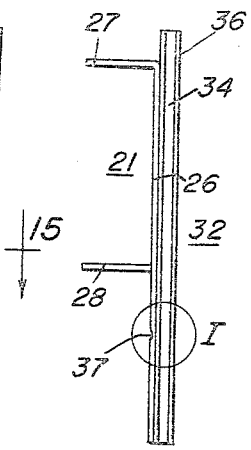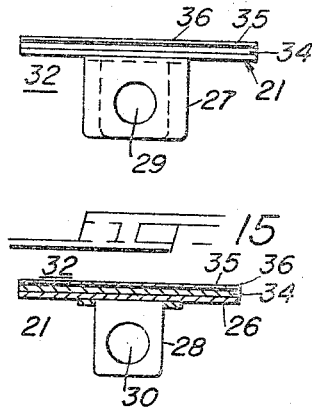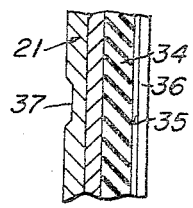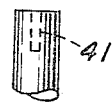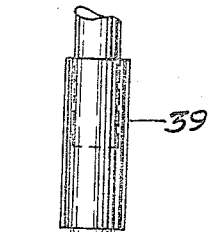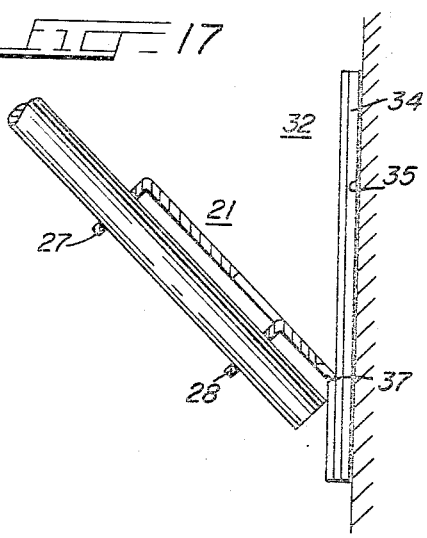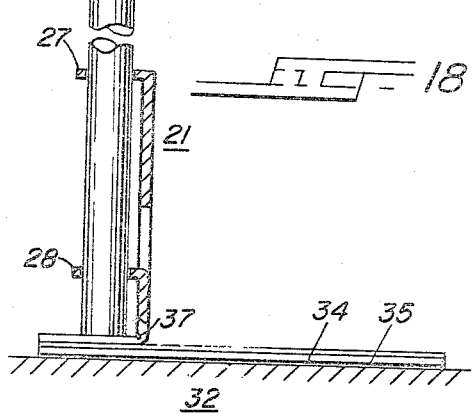

ABSTRACT OF THE DISCLOSURE

Structures including various types of main support elements and mounting standards for various coordinated use in overhead positioning of advertising display facilities on store walls above individual merchandise racks and/or across aisles between racks.

---

This invention relates to an advertising display facility especially adapted for use in the modern supermarkets.

In the modern supermarket vogue for product merchandising extensive use is made of eye-arresting displays both of the products and advertisements. The products in such stores are set up on rather standard-type shelving racks. These are so arranged as to define a plurality of aisles along which the store patrons may move to observe and select the products desired, or that may, at the moment, make an appeal. Generally, these racks incorporate a more or less standard form of channeled element for the insertion of price indicia tabs adjacent the stacked products.

To arrest the attention of patrons, it is quite conventional to arrange various printed and/or pictured product displays. These may be hung from walls, erected above the individual shelf racks, or arched over the aisles.

The main objects of this invention are: to provide an improved advertising display facility for use in supermarket merchandise centers; to provide a facility of this kind comprising a plurality of uniquely-structured units which may be variously assembled for advertising displays from store walls, or shelves, above the merchandise racks and/or spanning the aisles between the merchandise racks; and to provide improved types of unit for assemblies of this kind which are so structured as to make very economical their manufacture and marketing and exceedingy facile and gratifying their various assemblies and use.

In the adaptations shown in the accompanying drawings:

FIG. 1 is a diagrammatic, front, elevational view of one type of advertising display facility constructed in accordance with this invention;

FIG. 2 is an enlarged, fragmentary, cross-sectional view of portions of the main support element and display standard shown within the circles D, E and F of FIG. 1;

FIG. 3 is a cross-sectional elevational view taken on the plane of the line 3—3 of FIG. 2;

FIG. 4 is a top view of what is shown directly above in FIG. 2;

FIG. 5 is a sectional elevation taken on the plane of the line 5—5 of FIG. 4;

FIG. 6 is a diagrammatic, front elevational view similar to that shown in FIG. 1 embodying modified forms of main support elements and display standards for an advertising display facility constructed in accordance with this invention;

FIG. 7 is an enlarged, vertical, cross-sectional view of the type of support element shown in the circle F of FIG. 6;

FIG. 8 is a side sectional view of the support element shown in FIG. 7, as taken on the plane of the line 8—8 of that figure;

FIG. 9 is a diagrammatic, front elevational view similar to that of FIG. 1 but showing a modified form of main support element;

FIG. 10 is an enlarged, fragmentary, cross-sectional view of the type of support element shown in the circle H of FIG. 9;

FIG. 11 is a partly sectional side view taken on the plane of the line 11—11 of FIG. 10;

FIG. 12 is a front elevational view of a modified form of main support element for mounting an advertising display facility constructed in accordance with this invention;

FIG. 13 is a side elevational view of the main support element shown in FIG. 12;

FIG. 14 is a top end view of the support element shown in FIGS. 12 and 13;

FIG. 15 is a cross-sectional view taken on the plane of the line 15—15 of FIG. 12;

FIG. 16 is a much-enlarged, cross-sectional view of that portion of the element shown in FIG. 13 taken within the circle I;

FIG. 17 is a side view, partly sectional and partly elevational, of a further modified main support element shown in FIG. 12;

FIG. 18 is a view similar to FIG. 17 but showing a slight modified form thereof; and FIG. 19 is fragmentary view of the end extension on the rods of FIG. 2 when used with the type of standard shown in FIG. 18.

An advertising display facility, for use on various store structures A, and embodying the foregoing concept comprises various forms of main support elements B and various forms of mounting standards C.

Supermarket stores provide at least two structures A for the overhead display facilities. These are the walls AW and the merchandise racks AR. The wall structures AW may be above merchandise racks AR or at points where racks (or counters) are set up against the walls AW. Merchandise racks AR differ somewhat in material and design. Some are somewhat pyramidal in shape, as outlined in FIGS. 1 and 6 hereof. Others may be just plain rectangular in form. Whatever the shape, one feature is rather common to all. That is the price rail PR in which are removably inserted price tabs adjacent the stacked merchandise. One quite conventional form of price rail PR is shown in FIGS. 2 and 7.

The main support elements B, as hereinshown, are either in the form of a bracket 21 or a spring 22 for attachment to either the price rail PR, or to a plate 32. The mounting standards C, as hereinshown, are in the nature of posts 23, tubes 24 and clamped rods 25.

The bracket 21, as hereinshown, is a metal stamping forming a base part 26 with outwardly-disposed and vertically-spaced arms 27 and 28 with vertically-aligned openings 29 and 30. In this particular form the arm 27 is the bent-over end of the base 26 whereas the arm 28 is struck-out intermediate the ends of the base 26. The lower end of the bracket 21 has bonded thereto either a U-shaped clamp 31 (FIG. 7), adjacently below the lower arm 28 or to a flat plate 32 (FIG. 17). Each bracket 21 is spanned by a transverse groove 37 for a purpose to be explained later.

This U-shaped clamp 31 has the extremities of the parallel parts flared outwardly away from each other. A screw 33 is threaded into one of the parallel parts of the clamp in normal opposition to the other parallel part. Such a screw 33 is adapted to expand the flared extremities of the U-shaped clamp 31 to secure the bracket 21 to the price rail PR (FIGS. 2 and 7).

The plate 32 as hereinshown is a narrow, flat, rectangular piece of rather firm strap-metal. The back of the plate 32 is covered with a strip of compressible material 34 overlaid with a film of pressure-sensitive adhesive 35 covered by a protective sheet 36 of tough material (FIG. 16).

The spring 22 is hereinshown as a flat, stiffly-resilient piece of strap-metal of U-shape contour. One leg 38 extends beyond the other for mounting to a U-shaped clamp 31 or for attachment to a plate 32, FIGS. 2 and 10.

The posts 23 as hereinshown are about ⅜″ dowel stock about 24 inches long. Generally, there are two pairs of such posts 23 each pair with a sleeve 39 for telescopic positioning of such a pair in axial alignment (FIG. 18). Each such post 23 has a small bore 41 (FIG. 18) drilled therein ¾″ or one inch deep and of a diameter as that of the rods 25 for a purpose presently to be explained. These posts 23 are used with the bracket 21 type of main supporting elements B. The tubes 24 as hereinshown are conventional paper stock about 1½″ in diameter and approximately 30 inches long. These are used with the spring 22 type of main supporting elements B.

The rods 25 are rather stiff but somewhat resilient steel and are approximately 24 inches long. One end of each rod 25 is transversely bent either to provide a U-shaped extension 42 about 2 inches long (FIG. 2), or a straight extension 43 about ¾ inch long (FIG. 19). These two rods 25 are held in overlapping, parallel relationship by a spring grip 44 (FIGS. 2, 4 and 5).

The spring grip 44, when removed from the rods, is of normal arcuate contour with transversely-disposed finger-pads 46. The grip 44 also has a pair of elongated slots 47 disposed longitudinally intermediate the pads 46 and the transverse median. The grip 44 has to be flexed inwardly, by finger pressure on the pads 46, to permit the two rods 25 to be inserted, in contacting parallel relationship, through these two slots 47 with the extensions 42 and 43 spacedly opposed. Once the rods 25 have been inserted thusly through the grip slots 47 they are secured against any relative axial movement, pending a contraction of the grip 44.

The herein-described advertising display facility makes possible setting up any one of three eye-arresting and succinct information banners as shown in FIGS. 1, 6 and 9. As will be quite evident from FIGS. 1 and 6, the store structure A involves the merchandise racks AR whereas in the set-up of FIG. 9 the store structure A involves the walls AW.

The display facility of FIG. 1 employs mounting standards C in the form of the paper tubes 24. At their lower ends these tubes 24 are disposed above a main support element B in the form of the U-shaped spring 22 mounting a PR clamp 31. At their upper ends these tubes 24 seat the U-shaped extensions 42 on the display-suspension rods 25.

The display facility of FIGURE 6 employs a mounting standard C in the form of the dowel-type posts 23. At their lower ends these posts 23 are disposed above a main support element B in the form of the bracket 21, mounting a PR clamp 31. These dowel-type posts 23 extend through the openings in the arms 27 and 28 of the brackets 21. At their upper ends these posts 23 are shown attached directly to a display banner by suitable brads 48.

The display facility of FIG. 9 employs mounting standards C in the nature of the paper tubes 24. At their lower ends these tubes 24 are disposed above a main support element B in the form of a U-shaped spring 22 bonded to a main support element B in the form of a plate 32. At their upper ends these tubes 24 seat the U-shaped extensions 42 on the display suspension rods 25.

From FIGS. 7 and 17 it will be noted that with these mounting plates 32 secured to store structures AW the brackets 21 or springs 22 may be disposed at a considerable angle to the plates 32. From FIG. 18 it will be observed that the plates 32 could be secured to a horizontal store structure A with the brackets 21 (or springs 22) disposed normal to the plates 32.

Either of these main support elements B—bracket 21 or spring 22—mounting either the PR clamps 31 or the plates 32—could be positioned on store structures AR and/or AW to permit the suspension of banners in any part of the supermarket.

The display suspension rods 25, normally secured in fixed relationship by the spring grip 44, may be set to span almost any aisle between adjacent merchandise racks AW (FIGS. 1 and 6) or any reasonable space between contiguous walls AW. All that is required, to effect the axial adjustment of these rods 25, is to apply pressure to the finger-grip pads 46 to decrease the arc of the grip 44. This will permit relative shifting of the rods 25 through the slots 47 in the grip 44.

Although but one specific embodiment of this invention is herein shown and described, it will be understood that details of the construction shown may be altered or omitted without departing from the spirit of the invention as defined by the following claims.

I claim:

1. A supermarket advertising display facility comprising a pair of support brackets each having a pair of longitudinally spaced transverse arms with aligned openings adapted for horizontally-spaced removable attachment to opposed store structures, the support each having a portion thereof disposed in upright position therefrom, a pair of standards each comprising small diameter posts telescopically positionable on the upright portions of the respective supports in the aligned arm openings, the upper end of each of which posts has a bore for seating one of the transverse extensions on the display suspension means, and adjustable means having transversely-disposed extensions at the opposite ends thereof telescopically positionable on the upper ends of the respective standards for the suspension from the means of an advertising display between the store structures.

2. A supermarket advertising display facility as set forth in claim 1 wherein each bracket mounts a clamp for anchoring the bracket to a conventional price rail on a supermarket merchandise rack.

3. A supermarket advertising display facility as set forth in claim 1 wherein each bracket mounts a plate to one face of which the bracket is bonded and the other face of which plate is overlaid with a protected film of pressure-sensitive adhesive for anchoring the plate to a supermarket wall.

4. A supermarket advertising display facility as set forth in claim 1 wherein the support elements are inverted U-shaped strips of stiff spring-metal, and the pair of standards are tubes internally dimensioned for one end to telescopically embrace one of the spring-metal elements and the other end to telescopically seat a transverse extension on the display suspension means.

5. A supermarket advertising display facility as set forth in claim 4 wherein each spring-metal support element mounts a clamp for anchoring the element to a conventional price rail on a supermarket merchandise rack.

6. A supermarket advertising display facility as set forth in claim 4 wherein each spring-metal support element mounts a plate to one face of which plate one end of the spring-metal support element is bonded and the other face of which plate is overlaid with a protected film of pressure-sensitive adhesive for anchoring the plate to a supermarket wall.

7. A supermarket advertising display facility as set forth in claim 1 wherein each bracket mounts a plate to one face of which the bracket is bonded and the other face of which plate is overlaid with a protected film of pressure-sensitive adhesive for anchoring the plate to a supermarket wall, the plate having a transverse groove formed in one face thereof adjacent the bond thereof to the bracket to permit the bracket to be disposed at an angle to the plane of the plate.

8. A supermarket advertising display facility as set forth in claim 4 wherein each spring-metal support element mounts a plate to one face of which plate one end of the spring-metal support element is bonded and the other face of which plate is overlaid with a protected film of pressure-sensitive adhesive for anchoring the plate to a supermarket wall the plate having a transverse groove formed in one face thereof adjacent the bond thereof to the spring-strip support element to permit the spring-strip element to be disposed at an angle to the plane of the plate.

9. A supermarket advertising display facility comprising, a pair of support elements adapted for horizontally-spaced removable attachment to opposed store structures, the elements each having a portion thereof disposed in upright position therefrom, a pair of standards telescopically positionable on the upright portions of the respective support elements, a pair of overlapping rods having their respective opposite ends bent to form transverse extensions adapted for telescopic positioning on the upper end of the respective standards, and means for holding the pair of rods in axially adjustable overlapping relationship for suspension from the rods of an advertising display.

10. A supermarket advertising display facility comprising, a pair of support elements adapted for horizontally-spaced removable opposed store structures, the elements each having a portion thereof disposed in upright position therefrom, a pair of standards telescopically positionable on the upright portions of the respective support elements, a pair of overlapping rods having their respective opposite ends bent to form transverse extensions adapted for telescopic positioning on the upper end of the respective standards for the suspension from the rods of an advertising display, an arcuate-shaped strip of stiff spring-metal having integrated transversely-disposed finger-pads at the opposite ends thereof, and a pair of longitudinally-disposed elongated slots respectively intermediate the transverse median of the strip and the finger pads and through which slots extend the overlapping rods.

11. A supermarket advertising display facility as set forth in claim 10 wherein the support elements are brackets each having a pair of longitudinally-spaced transverse arms with aligned openings, and the pair of standards are small diameter posts telescopically positionable in the aligned arm openings, the upper end of each of which posts has a bore for seating one of the transverse extensions on the advertising display suspension rods.

12. A supermarket advertising display facility as set forth in claim 11 wherein each bracket mounts a clamp for anchoring the bracket to a conventional price rail on a supermarket merchandise rack.

13. A supermarket advertising display facility as set forth in claim 11 wherein each bracket mounts a plate to one face of which the bracket is bonded and the other face of which plate is overlaid with a protected film of pressure-sensitive adhesive for anchoring the plate to a supermarket wall.

14. A supermarket advertising display facility as set forth in claim 10 wherein the support elements are inverted U-shaped strips of stiff spring-metal, and the pair of standards are tubes internally dimensioned for one end to telescopically embrace one of the spring-metal elements and the other end to telescopically seat a transverse extension on the display suspension means.

15. A supermarket advertising display facility as set forth in claim 14 wherein each spring-metal support element mounts a clamp for anchoring the element to a conventional price rail on a supermarket mechandise rack.

16. A supermarket advertising display facility as set forth in claim 14 wherein each spring-metal support element mounts a plate to one face of which plate one end of the spring-metal support element is bonded and the other face of which plate is overlaid with a protected film of pressure-sensitive adhesive for anchoring the plate to a supermarket wall.

17. A supermarket advertising display facility as set forth in claim 10 wherein each bracket mounts a plate to one face of which the bracket is bonded and the other face of which plate is overlaid with a protected film of pressure-sensitive adhesive for anchoring the plate to a supermarket wall, the plate having a transverse groove formed in one face thereof adjacent the bond thereof to the bracket to permit the bracket to be disposed at an angle to the plane of the plate.

18. A supermarket advertising display facility as set forth in claim 10 wherein each spring-metal support element mounts a plate to one face of which plate one end of the spring-metal support element is bonded and the other face of which plate is overlaid with a protected film of pressure sensitive adhesive for anchoring the plate to a supermarket wall, the plate having a transverse groove formed in one face thereof adjacent the bond thereof to the spring-strip support element to permit the spring-strip element to be disposed at an angle to the plane of the plate.

References Cited
UNITED STATES PATENTS

| | | | |
|---|---|---|---|
| 883,325 | 3/1908 | MacMillan | 5—332 |
| 2,814,140 | 11/1957 | Ellis | 40—125 |
| 3,015,897 | 1/1962 | Hopps | 248—223 X |

ROY D. FRAZIER, *Primary Examiner.*

J. F. FOSS, *Assistant Examiner.*